(12) United States Patent
Huenefeld

(10) Patent No.: US 10,867,529 B2
(45) Date of Patent: Dec. 15, 2020

(54) YARD SIGN FRAME

(71) Applicant: Dee Sign Co., West Chester, OH (US)

(72) Inventor: Braden R. Huenefeld, West Chester, OH (US)

(73) Assignee: Dee Sign Co., West Chester, OH (US)

( * ) Notice: Subject to any disclaimer, the term of this patent is extended or adjusted under 35 U.S.C. 154(b) by 0 days.

(21) Appl. No.: 16/173,526

(22) Filed: Oct. 29, 2018

(65) Prior Publication Data

US 2019/0130794 A1 May 2, 2019

Related U.S. Application Data

(60) Provisional application No. 62/578,744, filed on Oct. 30, 2017.

(51) Int. Cl.
| | |
|---|---|
| *G09F 7/18* | (2006.01) |
| *G09F 15/00* | (2006.01) |
| *G09F 19/22* | (2006.01) |
| *B29L 12/00* | (2006.01) |
| *B29C 45/00* | (2006.01) |
| *B29C 48/03* | (2019.01) |

(52) U.S. Cl.
CPC ............ *G09F 7/18* (2013.01); *G09F 15/0012* (2013.01); *G09F 19/228* (2013.01); *B29C 45/00* (2013.01); *B29C 48/03* (2019.02); *B29L 2012/00* (2013.01); *G09F 2007/1843* (2013.01)

(58) Field of Classification Search
CPC . G09F 7/18; G09F 15/0012; G09F 2007/1843
See application file for complete search history.

(56) References Cited

U.S. PATENT DOCUMENTS

| | | | | |
|---|---|---|---|---|
| 1,862,776 | A | * 6/1932 | Timberlake | G09F 15/0006 40/605 |
| 2,865,124 | A | * 12/1958 | Domenico | G09F 15/0068 40/605 |
| 3,132,431 | A | * 5/1964 | Petrie | G09F 15/0012 40/611.05 |
| 4,885,860 | A | 12/1989 | Huenefeld | |
| 4,916,840 | A | * 4/1990 | Getz | G09F 7/00 40/605 |
| 5,083,390 | A | * 1/1992 | Edman | G09F 7/18 40/607.02 |
| 5,113,627 | A | * 5/1992 | Jarrett, Sr. | E02D 5/801 248/156 |
| 5,207,402 | A | * 5/1993 | Berry-Tremmel | G09F 7/18 248/156 |
| 5,579,599 | A | * 12/1996 | Haeseler | G09F 7/18 248/156 |
| 5,617,660 | A | * 4/1997 | Pollack | G09F 15/0012 40/606.16 |
| D535,700 | S | 1/2007 | Huenefeld | |

(Continued)

*Primary Examiner* — Gary C Hoge
(74) *Attorney, Agent, or Firm* — Wood Herron & Evans LLP

(57) ABSTRACT

A yard sign frame comprises an injection molded universal base, the base comprising a pair of vertical frame members and at least one horizontal frame member interconnecting the vertical frame members, and a frame mounted on the base, the frame comprising a pair of extruded vertical frame members and at least one extruded horizontal frame member interconnecting the vertical frame members. The frame is adapted to receive a main sign panel.

10 Claims, 11 Drawing Sheets

(56) References Cited

U.S. PATENT DOCUMENTS

| | | |
|---|---|---|
| D537,884 S | 3/2007 | Huenefeld |
| D538,352 S | 3/2007 | Huenefeld |
| 7,266,918 B2 | 9/2007 | Huenefeld |
| 7,430,343 B2 | 9/2008 | Hayes et al. |
| 8,959,813 B2 * | 2/2015 | Denby ............... A47F 5/10 211/175 |
| 2009/0077849 A1 * | 3/2009 | Glass, Jr. ............ G09F 7/18 40/606.03 |

* cited by examiner

YARD SIGN FRAME

RELATED APPLICATIONS

This application claims the priority benefit of U.S. Provisional Patent Application No. 62/578,744 filed Oct. 30, 2017, which is hereby incorporated by reference herein as if fully set forth in its entirety.

FIELD OF THE INVENTION

This invention relates generally to signs, and more particularly to yard signs.

BACKGROUND OF THE INVENTION

Yard signs are used for a variety of different purposes. One particular use is to advertise the sale of homes. A realtor's signage or placard is placed in a sign frame which is then placed in the yard of the home to be sold.

As realtors use many different sizes (i.e., height dimension×width dimension) of signage or placards, many different sizes of sign frames are required.

It would be desirable to reduce the number of sizes of sign frames required to accommodate the various sizes of realtor signage and placards in order to reduce the manufacturing costs associated with manufacturing the sign frames.

SUMMARY OF THE INVENTION

In one aspect, a yard sign frame comprises an injection molded universal base, the base comprising a pair of vertical frame members and at least one horizontal frame member interconnecting the vertical frame members, and a frame mounted on the base, the frame comprising a pair of extruded vertical frame members and at least one extruded horizontal frame member interconnecting the vertical frame members. The frame is adapted to receive a main sign panel.

The yard sign frame can comprise first and second extruded horizontal frame members, one of which interconnects the extruded vertical frame members at upper ends thereof and the other of which interconnects the extruded vertical frame members at lower ends thereof and is connected to the at least one horizontal frame member of the base. The base can comprise first and second horizontal frame members interconnecting the vertical frame members of the base. The first and second horizontal frame members of the base and the vertical frame members of the base are adapted to receive a rider sign panel. The base can be injection molded of plastic and the frame members can be extruded of plastic. Each vertical frame member of the frame can include an elongated tube received in a respective one of the vertical frame members of the base.

In another aspect, a method of manufacturing a yard sign frame comprises injection molding a universal base having a pair of vertical frame members and at least one horizontal frame member interconnecting the vertical frame members, extruding at least three frame members, forming a frame from the at least three extruded frame members, the frame comprising a pair of vertical frame members and at least one horizontal frame member interconnecting the vertical frame members, the frame adapted to receive a main sign panel, and mounting the frame on the base.

The method can further comprise extruding four frame members, forming the frame from the four extruded frame members, the frame comprising the pair of vertical frame members and first and second horizontal frame members, one of which interconnects the vertical frame members at upper ends thereof and the other of which interconnects the vertical frame members at lower ends thereof, the frame adapted to receive a main sign panel, and mounting the frame on the base. The method can further comprise injection molding the universal base to have a pair of vertical frame members and first and second horizontal frame members interconnecting the vertical frame members, the first and second horizontal frame members of the base and the vertical frame members of the base adapted to receive a rider sign panel. The method can further comprise injection molding the universal base of plastic and extruding the frame members of plastic. The method can further comprise further inserting an elongated tube into each vertical frame member of the frame which is received in a respective vertical frame member of the base during mounting of the frame on the base.

In another aspect, a method of manufacturing a yard sign frame comprises providing an injection molded universal base having a pair of vertical frame members and at least one horizontal frame member interconnecting the vertical frame members, providing at least three extruded frame members, forming a frame from the at least three extruded frame members, the frame comprising a pair of vertical frame members and at least one horizontal frame member interconnecting the vertical frame members, the frame adapted to receive a main sign panel, and mounting the frame on the base.

The method can further comprise providing four extruded frame members, forming the frame from the four extruded frame members, the frame comprising the pair of vertical frame members and first and second horizontal frame members, one of which interconnects the vertical frame members at upper ends thereof and the other of which interconnects the vertical frame members at lower ends thereof, the frame adapted to receive a main sign panel, and mounting the frame on the base. The injection molded universal base can have a pair of vertical frame members and first and second horizontal frame members interconnecting the vertical frame members, the first and second horizontal frame members of the base and the vertical frame members of the base adapted to receive a rider sign panel. The universal base can be injection molded of plastic and the frame members can be extruded of plastic. The method can further comprise inserting an elongated tube into each vertical frame member of the frame which is received in a respective vertical frame member of the base during mounting of the frame on the base.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 1:
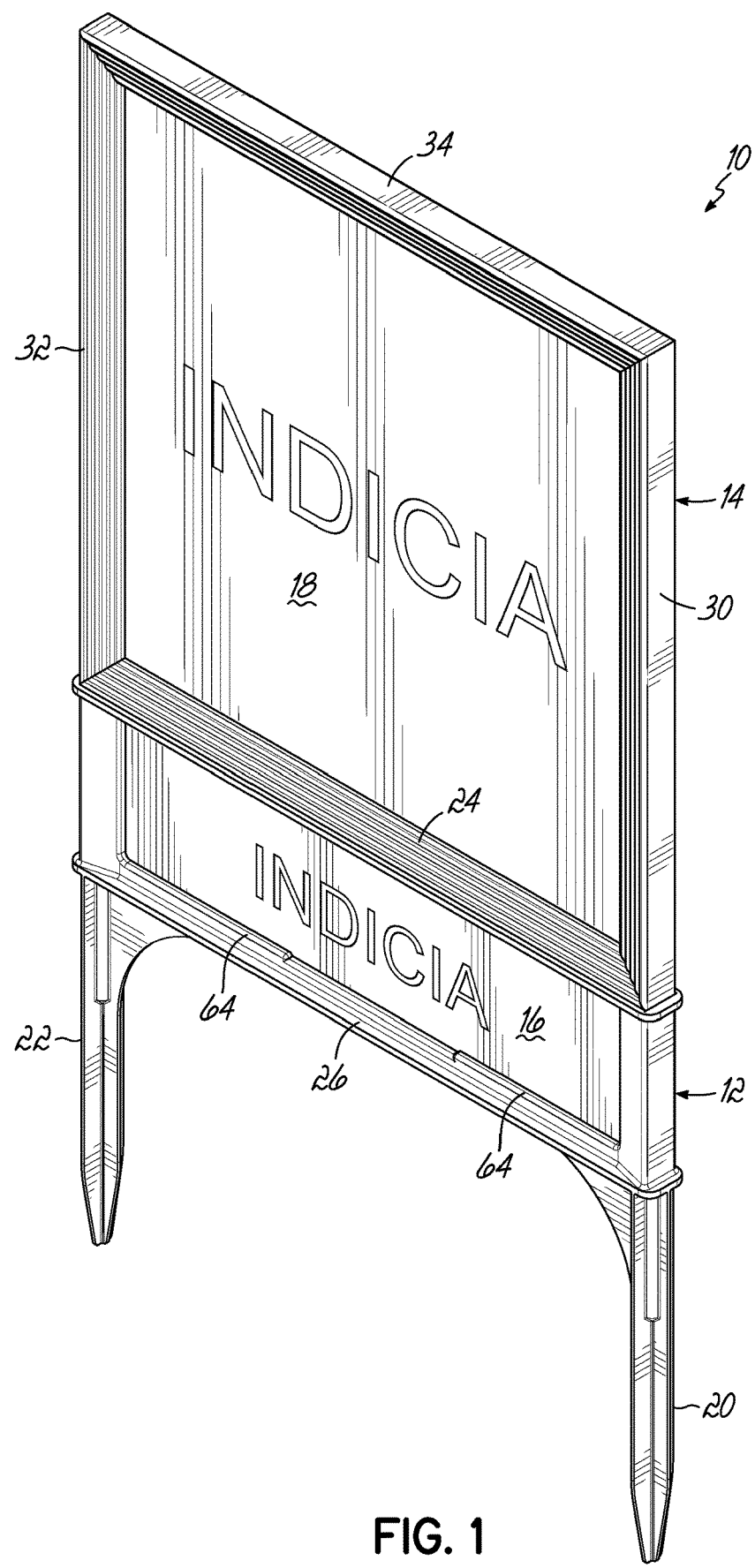
FIG. 1 is a perspective view of the yard sign frame of the present invention.
Figure 2:
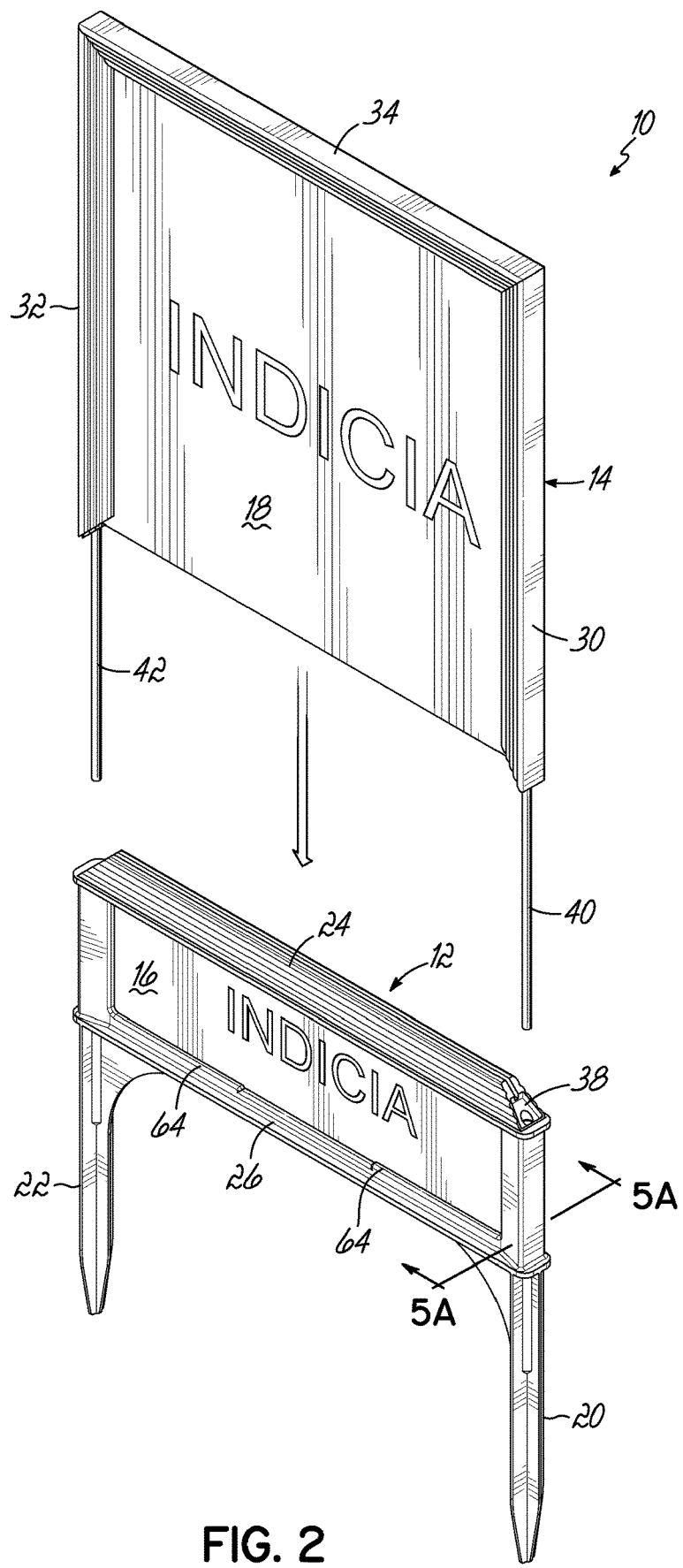
FIG. 2 is a partially exploded perspective view of the yard sign frame of FIG. 1.

Referring to first to FIGS. 1-6B, there is illustrated a yard sign frame 10 according to the principles of the present invention. The yard sign frame 10 includes a base 12 and a frame 14 mounted on the base 12. The base 12 is adapted to receive and display a rider sign panel 16 and the frame 14 is adapted to receive and display a main sign panel 18.

The base 12 is a "universal" base in that in can accommodate various sizes of frames 14, as will be more fully described below. To that end, base 12 is injection molded of plastic and comprises a pair of vertical frame members 20, 22 and a pair of horizontal frame members 24, 26 interconnecting the vertical frame members.

The frame 14 comprises a pair of plastic extruded vertical frame members 30, 32 and a plastic extruded horizontal frame member 34 interconnecting the vertical frame members. Upper corner connectors 36, also fabricated of plastic, can be used to connect ends of the horizontal frame member 34 with the upper ends of the vertical frame members 30, 32. Glue can also be used to more securely connect the corners with the corner connectors 36. Alternatively, the corners could be heat welded together.

Lower corner connectors 38, also fabricated of plastic, can be used to assist in connecting the lower ends of the vertical frame members 30, 32 with upper horizontal frame member 24 of base 12. In addition, male aluminum tubes 40, 42 are secured in vertical frame members 30, 32, respectively, of frame 14, and are received in female aluminum tubes 50, 52 molded into vertical frame members 20, 22, respectively, of base 12 to securely mount frame 14 on base 12. If desired, spring-loaded ball detent mechanisms can be used with male aluminum tubes 40, 42 and female aluminum tubes 50, 52 to retain frame 14 mounted to base 12.

Figure 3:
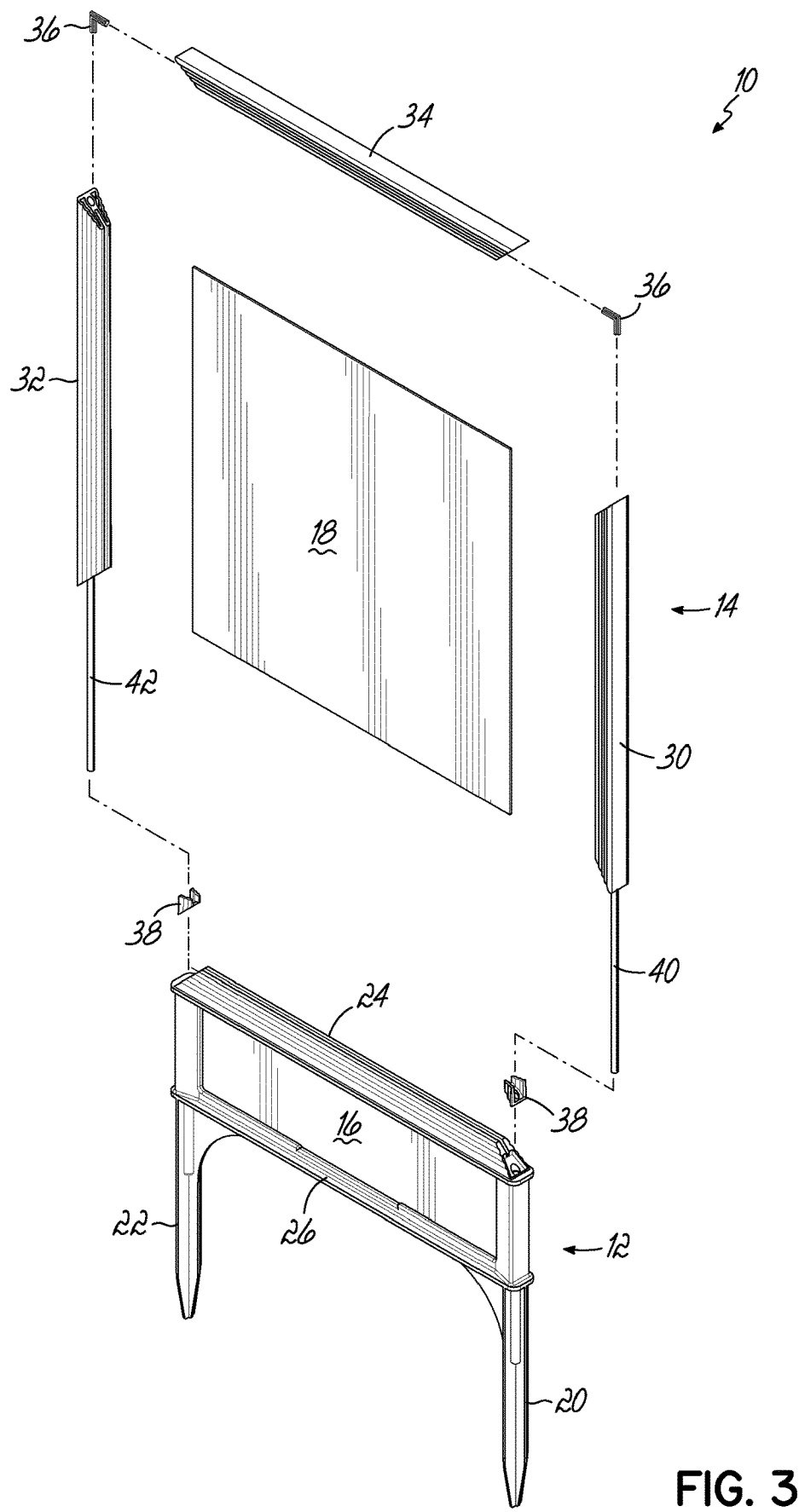
FIG. 3 is a fully exploded perspective view of the yard sign frame of FIG. 1.
Figure 3A:
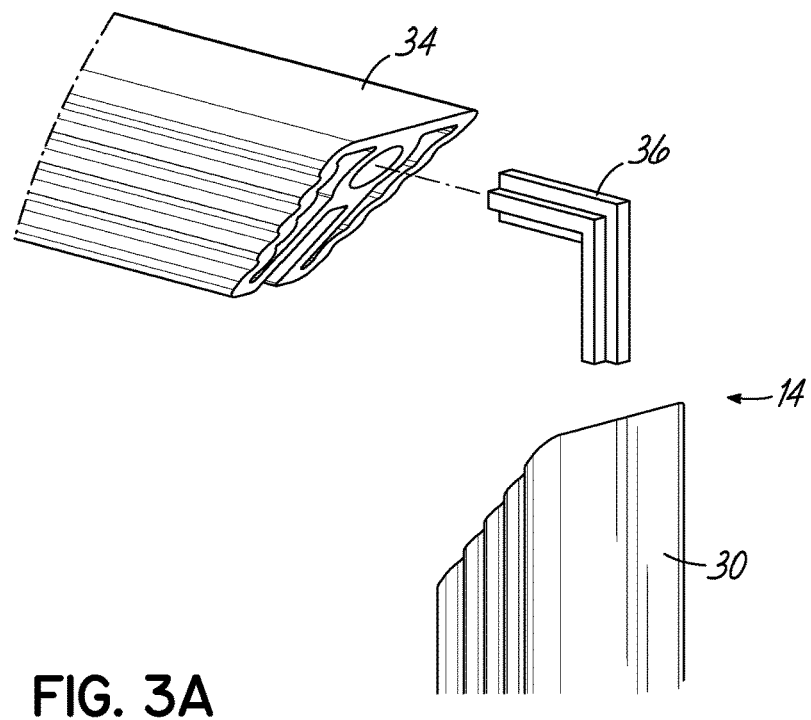
FIG. 3A is an enlarged exploded perspective view of the upper right hand frame joint of FIG. 1.
Figure 3B:
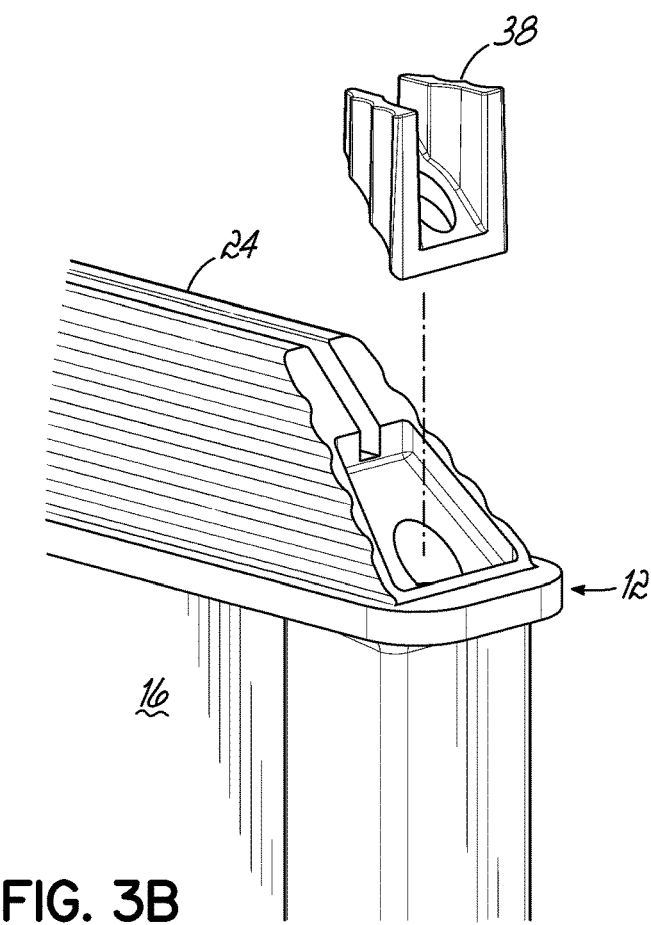
FIG. 3B is an enlarged exploded perspective view of the lower right hand frame joint of FIG. 1.

Referring to FIG. 3, the vertical frame members 30, 32 are cut from a length of extrusion in the appropriate length for the height of the main sign panel 18. Horizontal frame member 34 is cut from a length of extrusion in the appropriate width for the width of the main sign panel 18. A number of bases 12 can be injection molded for the standard widths of main sign panels, e.g. 18 inches, 24 inches, 30 inches, and 36 inches in width. The appropriate width of base 12 is chosen for the main sign panel 18 to be displayed in the yard sign frame 10. The corner connectors 36 are inserted in the ends of the extruded frame members 30, 32, and 34 thereby connecting the frame members 30, 32, and 34. The main sign panel 18 is slid into the grooves in the extruded frame members 30, 32, and 34. Male aluminum tubes 40, 42 are inserted into vertical frame members 30, 32, respectively. Lower connectors 38 are inserted into recesses in the upper ends of vertical frame members 20, 22 of base 12, and male aluminum tubes 40, 42 are slid into female aluminum tubes 50, 52, respectively and the main sign panel 18 is slid into the groove in horizontal frame member 24 in base 12, thereby mounting the frame 14 with main sign panel 18 therein on base 12.

Figure 4:
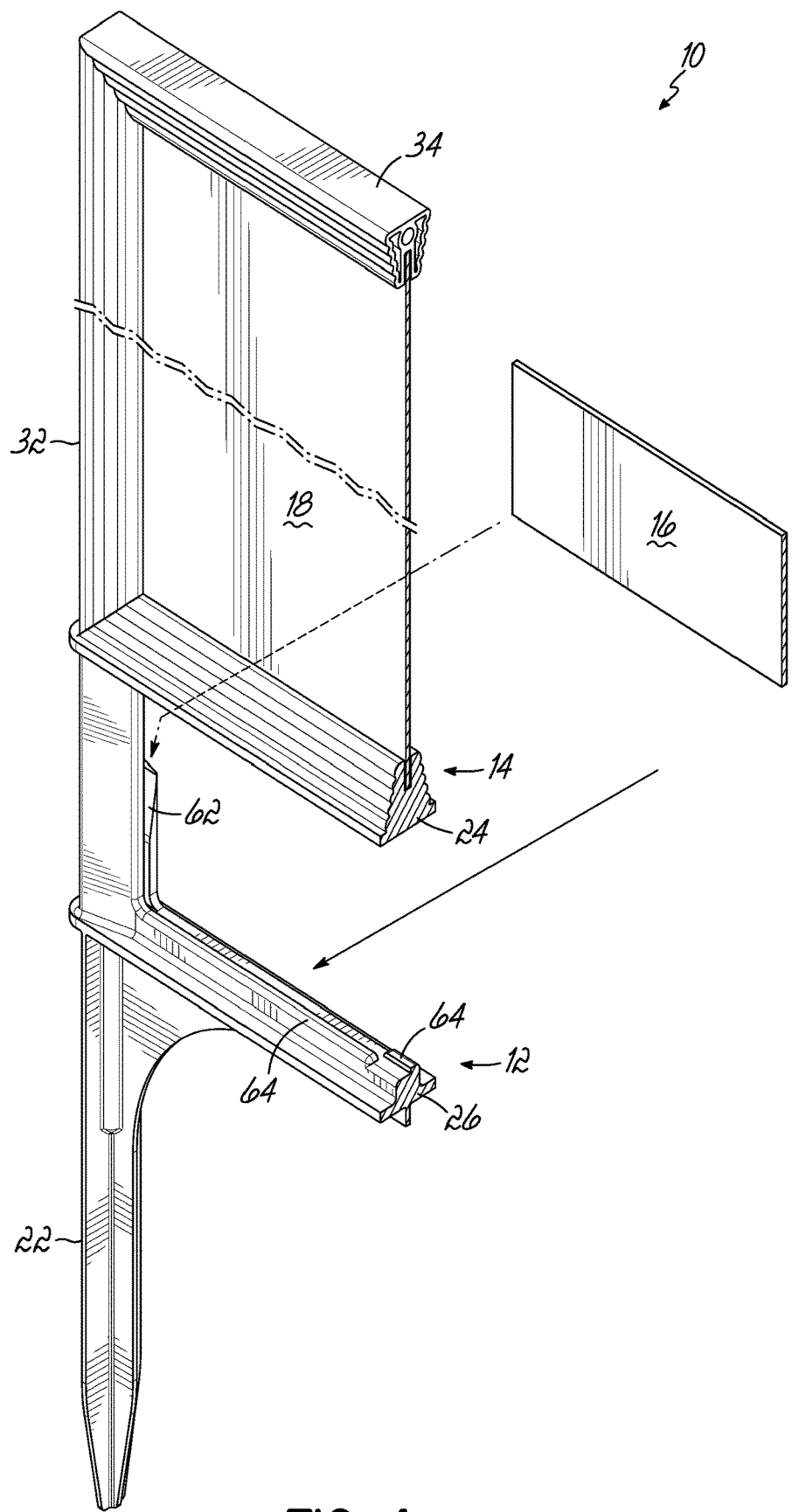
FIG. 4 is a vertical cross-section of the yard sign frame of FIG. 1.
Figure 5A:
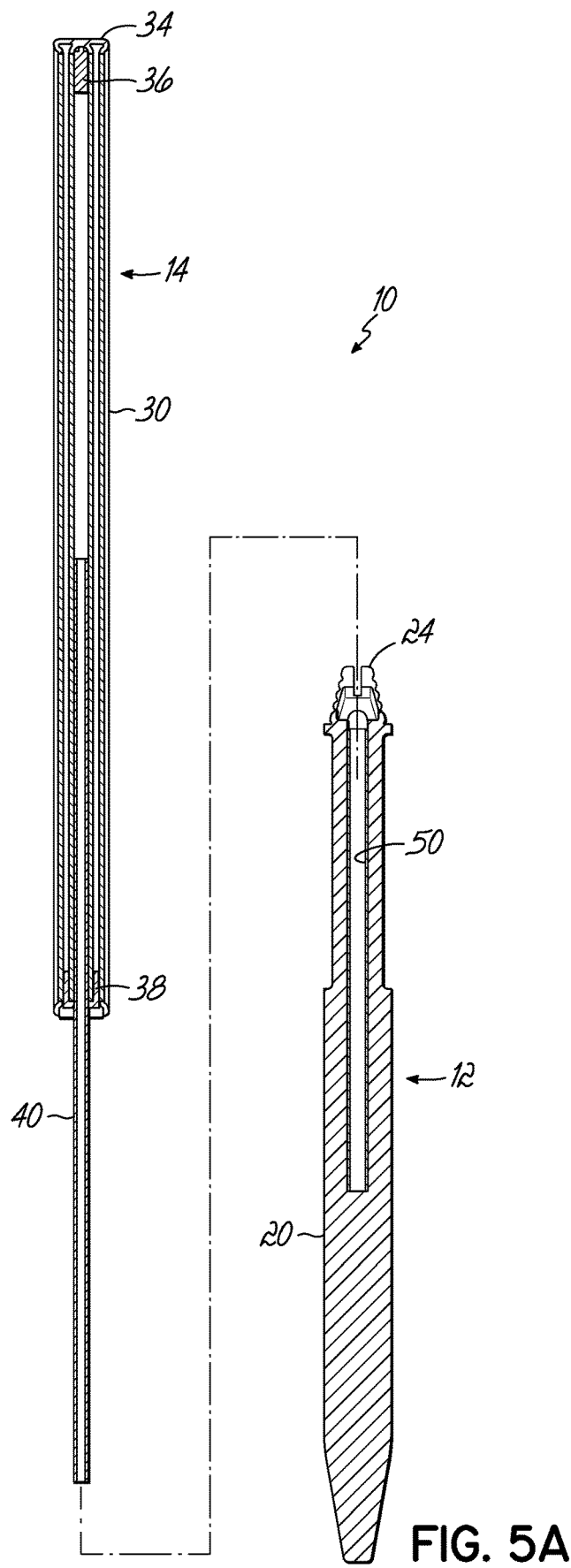
FIG. 5A is a cross-sectional view taken along line 5A-5A in FIG. 2.
Figure 5B:
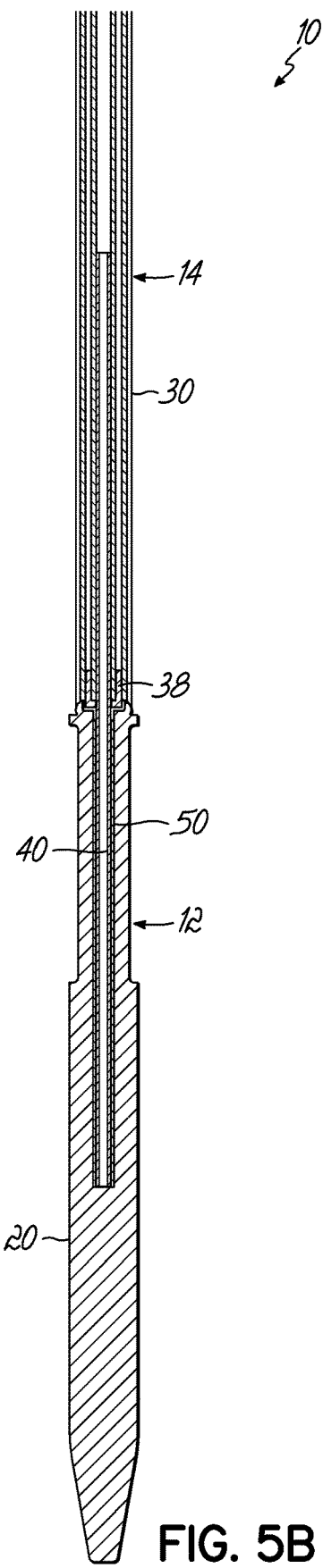
FIG. 5B is a cross-sectional view similar to FIG. 5A but with the frame attached to the base.
Figure 6A:
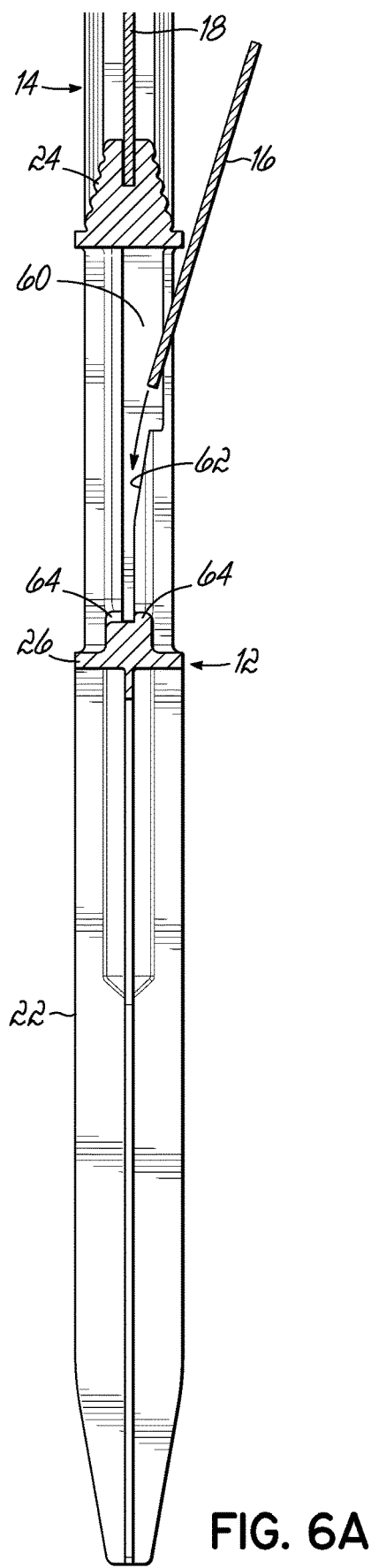
FIGS. 6A and 6B are enlarged cross-sectional views similar to FIG. 4 illustrating insertion of the rider sign panel.
Figure 6B:
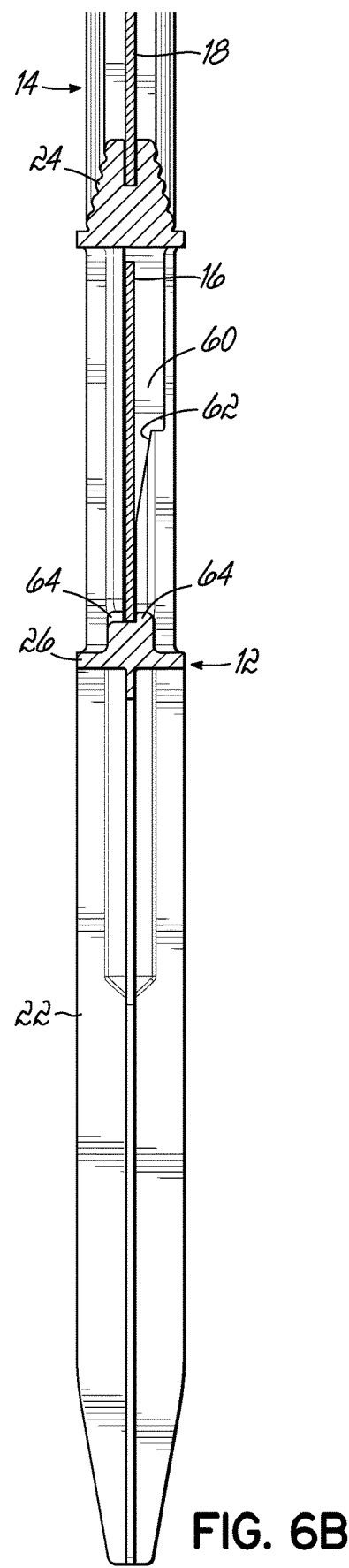

Referring to FIGS. 4, 6A, and 6B, rider sign panel 16 is slid downwardly through an opening 60 in the upper end of the rear side of each of the vertical frame members 20, 22 of base 12. An angled wall 62 assists in the insertion of the rider sign panel 16 downwardly into the grooves of the vertical frame members 20, 22. Left and right ribs 64 on the front of horizontal frame member 26 of base 12 cooperate with a similar but centrally located rib 64 on the rear of horizontal frame member 26 (i.e. the ribs 64 alternate front-to-back) retain the rider sign panel 16 and prevent it from being dislodged due to wind while at the same time minimizing blocking of the text and/or designs on the rider sign panel 16.

Figure 7:
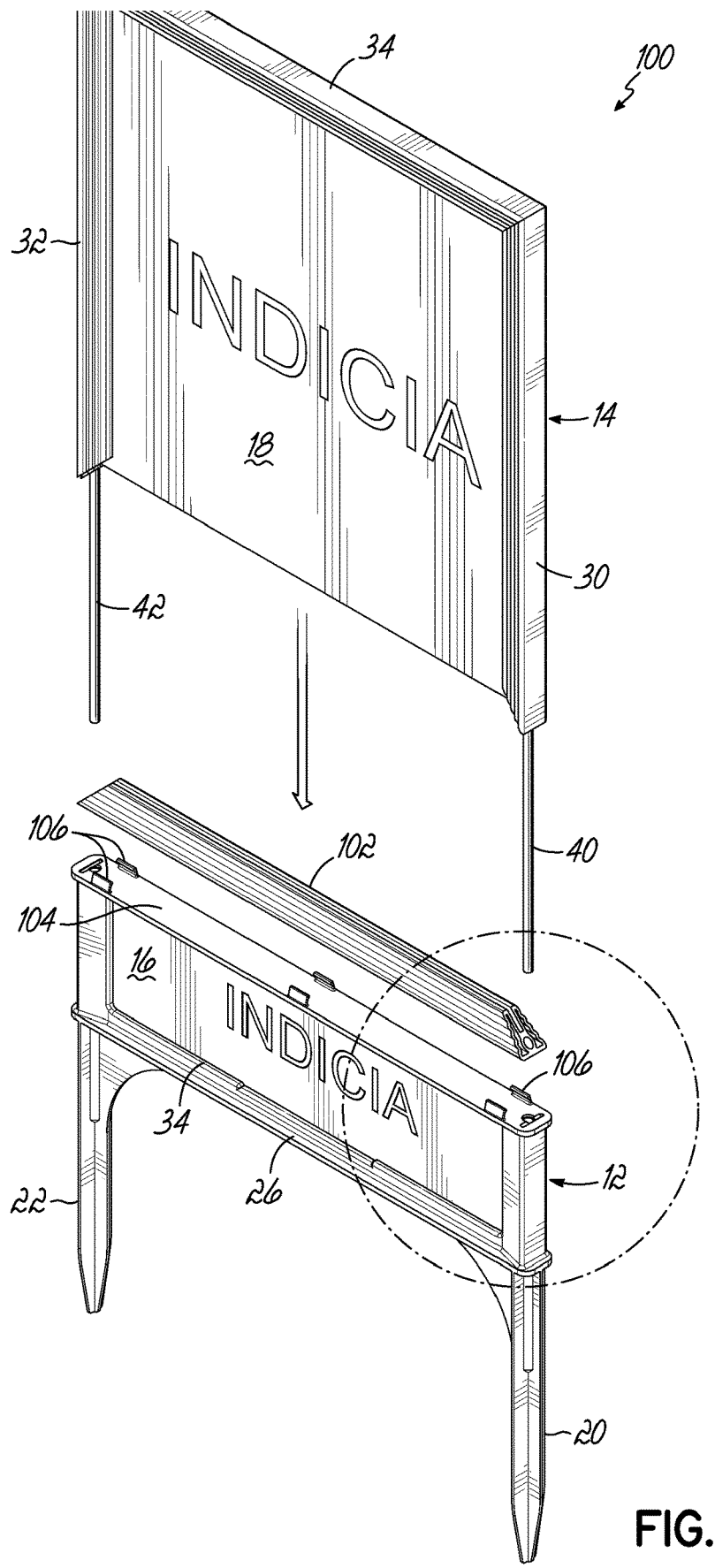
FIG. 7 is a partially exploded perspective view of another embodiment of yard sign frame of the present invention.
Figure 7A:
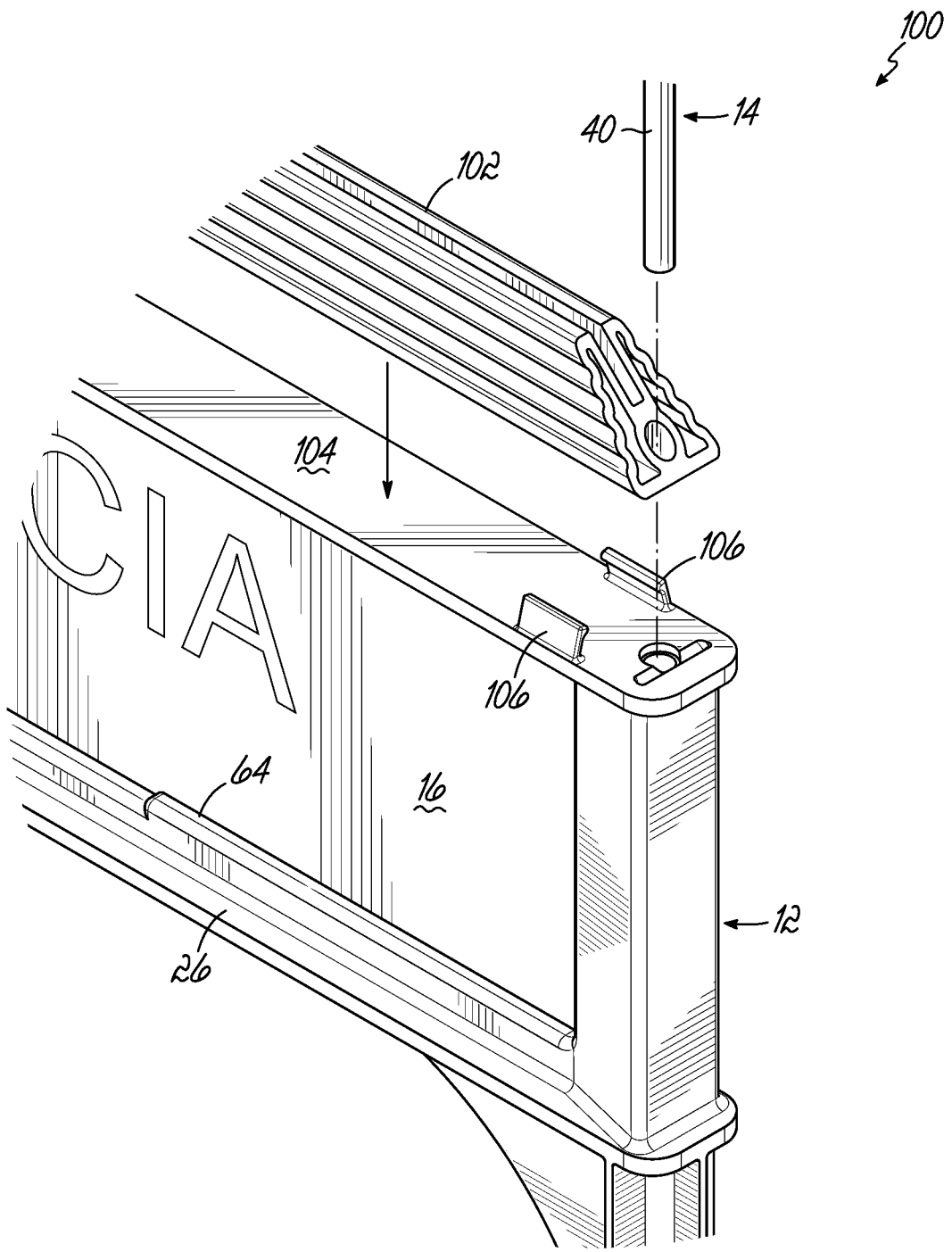
FIG. 7A is an enlarged perspective view of the encircled area of FIG. 7.
Figure 8:
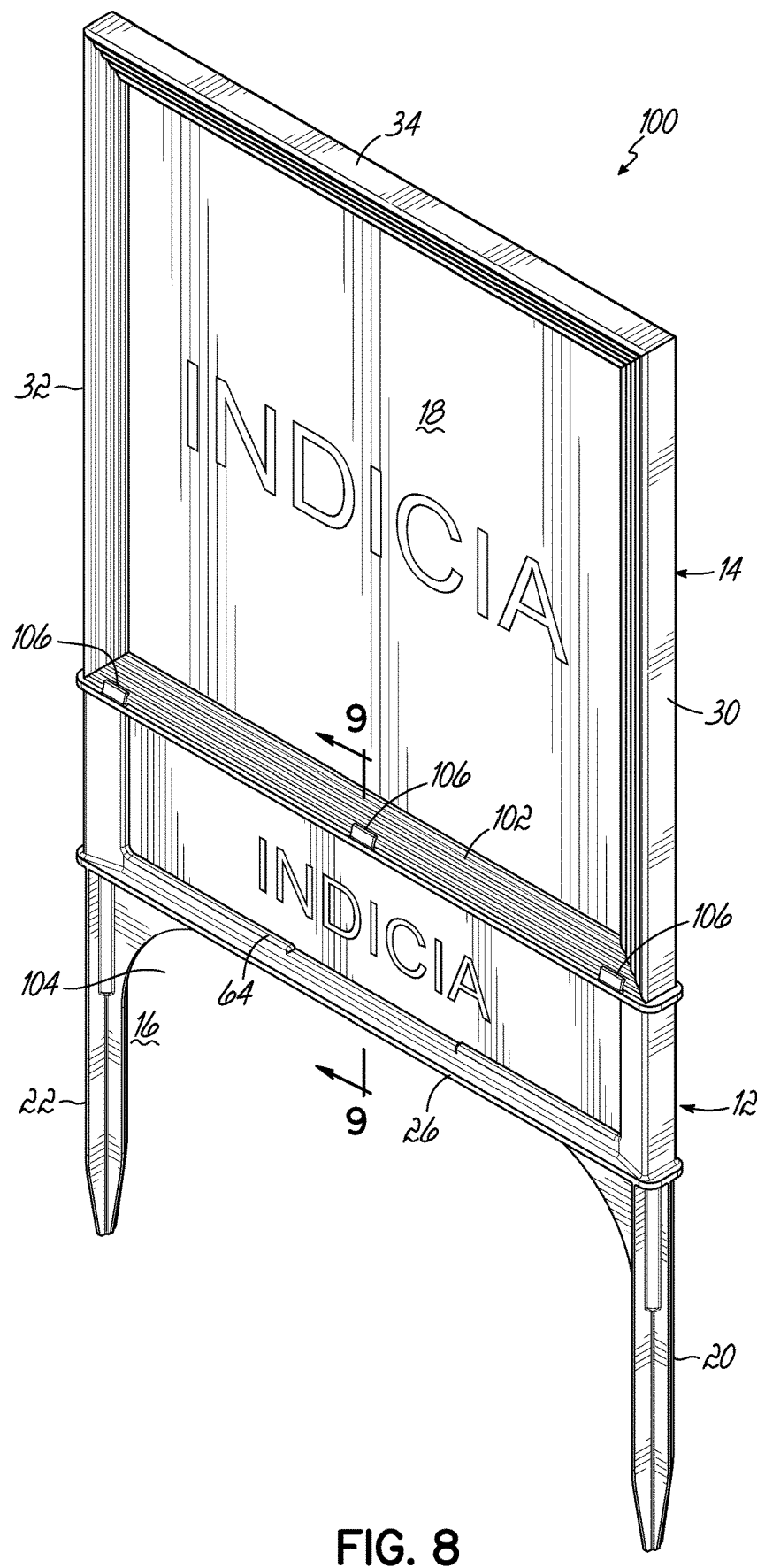
FIG. 8 is a perspective view of the yard sign frame of FIG. 7.
Figure 9:
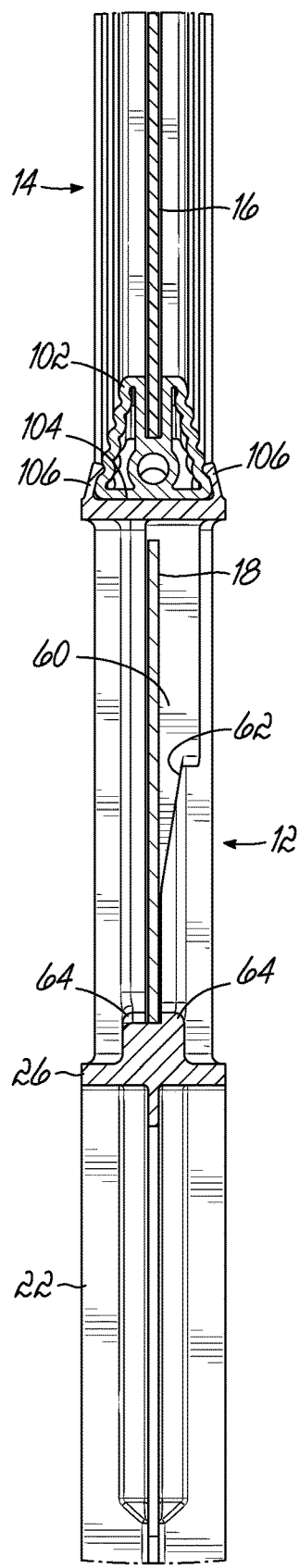
FIG. 9 is a view taken along line 9-9 in FIG. 8.

It will be noted that in the FIGS. 1-6B embodiment, the "profile" of the upper horizontal frame member 24 of base 12 is the same as, or otherwise matches, the "profile" of the vertical frame members 30, 32 and horizontal frame member 34 of frame 14. In order to not limit the profile of the frame 14 to the profile of the horizontal frame member 24 of the base 12, four, rather than three, extrusions can be used to form the frame 14. Referring now to FIGS. 7-9, an alternative embodiment of yard sign frame 100 is illustrated. With like numbers representing like elements in the FIGS. 1-6B embodiment, frame 14 includes the aforementioned vertical frame members 30, 32 and upper horizontal frame member 34, as well as a lower horizontal frame member 102. The profiles of the four frame members of the frame 14 can thus be chosen independently of the base 12. The upper horizontal frame member 104 of the base 12 is generally flat and includes tabs 106 which are a snap fit around the bottom or base of lower horizontal frame member 102 of frame 14. As in the prior embodiment, male aluminum tubes 40, 42 are inserted into vertical frame members 30, 32, respectively, and are received in female aluminum tubes 50, 52, respectively, in vertical frame members 20, 22, respectively, of base 12.

By injection molding only the base, and forming the main sign panel receiving frame of extruded frame members, manufacturing costs are significantly reduced. The invention avoids having to injection mold the entire yard sign frame in every standard width and in whatever height the main sign panel is. Instead, a universal base for every standard width main sign panel is injection molded of plastic, and plastic extrusions may be cut to length depending on the height of the main sign panel to be displayed in the yard sign frame. Thus, the number of injection molds is significantly reduced.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. The invention resides in each individual feature described herein, alone, and in all combinations of any and all of those features. Departures may therefore be made from such details without departing from the spirit or scope of the general inventive concept. Accordingly, the scope of the invention shall be limited only by the following claims and their equivalents.

What is claimed is:

1. A yard sign frame comprising:
an injection molded universal plastic base comprising a single, unitary, monolithic structure, said base comprising a pair of vertical frame members and at least a first horizontal frame member interconnecting said vertical frame members,
a plastic frame mounted on said base, said frame comprising a pair of separate, individual extruded vertical frame members and at least a first separate, individual extruded horizontal frame member interconnecting said vertical frame members, said frame adapted to receive a main sign panel,
a pair of plastic upper corner connectors, each of which connects a respective end of said extruded horizontal frame member to an upper end of a respective one of said extruded vertical frame members, and
each said vertical frame member of said frame including an elongated male tube extending therefrom, each said vertical frame member of said base including an elongated female tube therein, respective ones of said male tubes received in respective ones of said female tubes.

2. The yard sign frame of claim 1 further comprising a second separate, individual extruded horizontal frame member, one of said first and second extruded horizontal frame members interconnects said extruded vertical frame members at upper ends thereof and the other of said first and second extruded horizontal frame members interconnects said extruded vertical frame members at lower ends thereof and is connected to said at least one horizontal frame member of said base, and a pair of plastic lower corner connectors, each of which connects a respective end of said other extruded horizontal frame member to a lower end of a respective one of said extruded vertical frame members.

3. The yard sign frame of claim 2 wherein said base further comprises a second horizontal frame member interconnecting said vertical frame members of said base, said first and second horizontal frame members of said base and said vertical frame members of said base adapted to receive a rider sign panel, an uppermost one of said first and second horizontal frame members of said base including tabs which are a snap fit around a base of said other extruded horizontal frame member.

4. The yard sign frame of claim 1 wherein said base is manufactured to a standard width of main sign panel, wherein the standard width is selected from the group consisting of 18 inches in width, 24 inches in width, 30 inches in width, and 36 inches in width.

5. A method of manufacturing a yard sign frame comprising:
injection molding a universal plastic base as a single, unitary, monolithic structure having a pair of vertical frame members and at least one horizontal frame member interconnecting the vertical frame members,
extruding at least three separate, individual plastic frame members,
forming a frame from the at least three extruded frame members, the frame comprising a pair of vertical frame members and at least one horizontal frame member interconnecting the vertical frame members, the frame adapted to receive a main sign panel,
forming a pair of plastic upper corner connectors,
utilizing each of the pair of corner connectors to connect a respective end of the extruded horizontal frame member to an upper end of a respective one of the extruded vertical frame members,
installing an elongated male tube in each vertical frame member of the frame so as to extend therefrom,
installing an elongated female tube in each vertical frame member of the base; and
mounting the frame on the base by inserting respective ones of the male tubes into respective ones of the female tubes.

6. The method of claim 5 comprising:
extruding four frame members,
forming the frame from the four extruded frame members, the frame comprising the pair of vertical frame members and first and second horizontal frame members, one of which interconnects the vertical frame members at upper ends thereof and the other of which interconnects the vertical frame members at lower ends thereof, the frame adapted to receive a main sign panel, and
mounting the frame on the base.

7. The method of claim 5 comprising injection molding the universal base to have a pair of vertical frame members and first and second horizontal frame members interconnecting the vertical frame members, the first and second horizontal frame members of the base and the vertical frame members of the base adapted to receive a rider sign panel.

8. A method of manufacturing a yard sign frame comprising:
providing an injection molded universal plastic base formed as a single, unitary, monolithic structure having a pair of vertical frame members and at least one horizontal frame member interconnecting the vertical frame members,
providing at least three separate, individual extruded plastic frame members,
forming a frame from the at least three extruded frame members, the frame comprising a pair of vertical frame members and at least one horizontal frame member interconnecting the vertical frame members, the frame adapted to receive a main sign panel,
providing a pair of plastic upper corner connectors,
connecting a respective end of the extruded horizontal frame member to an upper end of a respective one of the extruded vertical frame members with each of the pair of corner connectors,
providing an elongated male tube in each vertical frame member of the frame so as to extend therefrom,
providing an elongated female tube in each vertical frame member of the base; and
mounting the frame on the base by inserting respective ones of the male tubes into respective ones of the female tubes.

9. The method of claim 8 comprising:
providing four extruded frame members,
forming the frame from the four extruded frame members, the frame comprising the pair of vertical frame members and first and second horizontal frame members, one of which interconnects the vertical frame members at upper ends thereof and the other of which interconnects the vertical frame members at lower ends thereof, the frame adapted to receive a main sign panel, and
mounting the frame on the base.

10. The method of claim 8 wherein the injection molded universal base has a pair of vertical frame members and first and second horizontal frame members interconnecting the vertical frame members, the first and second horizontal frame members of the base and the vertical frame members of the base adapted to receive a rider sign panel.

* * * * *